US 8,344,108 B2

(12) United States Patent
Cheryan

(10) Patent No.: US 8,344,108 B2
(45) Date of Patent: Jan. 1, 2013

(54) METHOD AND SYSTEM FOR CORN FRACTIONATION

(75) Inventor: Munir Cheryan, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 346 days.

(21) Appl. No.: 12/506,862

(22) Filed: Jul. 21, 2009

(65) Prior Publication Data

US 2010/0016554 A1 Jan. 21, 2010

Related U.S. Application Data

(63) Continuation-in-part of application No. 11/327,166, filed on Jan. 6, 2006, now Pat. No. 7,569,671.

(60) Provisional application No. 60/641,664, filed on Jan. 6, 2005.

(51) Int. Cl.
| C07K 1/14 | (2006.01) |
| C07K 1/34 | (2006.01) |
| C07K 1/36 | (2006.01) |
| C07K 14/425 | (2006.01) |

(52) U.S. Cl. ........ 530/376; 530/370; 530/412; 530/414; 530/418; 530/422; 530/424

(58) Field of Classification Search .................. None
See application file for complete search history.

(56) References Cited

U.S. PATENT DOCUMENTS

| 3,962,335 A | 6/1976 | Kumar |
| 3,963,575 A | 6/1976 | Bulich |
| 4,093,540 A | 6/1978 | Sen Gupta |
| 4,224,219 A | 9/1980 | Van Blanton et al. |
| 4,414,157 A | 11/1983 | Iwama et al. |
| 4,486,353 A | 12/1984 | Matsuzaki et al. |
| 4,545,940 A | 10/1985 | Mutoh et al. |
| 4,624,805 A | 11/1986 | Lawhon |
| 4,716,218 A | 12/1987 | Chen et al. |
| 4,787,981 A | 11/1988 | Tanahashi et al. |
| 5,077,441 A | 12/1991 | Kuk et al. |
| 5,166,376 A | 11/1992 | Suzuki et al. |
| 5,254,673 A | 10/1993 | Cook et al. |
| 5,310,487 A | 5/1994 | LaMonica |
| 5,342,923 A | 8/1994 | Takahashi et al. |
| 5,367,055 A | 11/1994 | Takahashi et al. |
| 5,410,021 A | 4/1995 | Kampen et al. |
| 5,482,633 A | 1/1996 | Muraldihara et al. |
| 5,510,463 A | 4/1996 | Takahashi et al. |
| 5,545,329 A | 8/1996 | LaMonica |
| 5,580,959 A | 12/1996 | Cook et al. |
| 5,602,286 A | 2/1997 | Muralidhara |
| 5,773,076 A | 6/1998 | Liaw et al. |
| 5,968,585 A | 10/1999 | Liaw et al. |
| 6,365,732 B1 | 4/2002 | Van Thorre |
| 6,433,146 B1 | 8/2002 | Cheryan |
| 7,045,607 B2 | 5/2006 | Cheryan |
| 7,148,366 B2 | 12/2006 | Cheryan |
| 2002/0183490 A1 | 12/2002 | Cheryan |
| 2003/0176669 A1 | 9/2003 | Van Thorre |
| 2007/0037993 A1 | 2/2007 | Cheryan |

OTHER PUBLICATIONS

N. Singh, M. Cheryan, "Extraction of Oil from Corn Distillers Dried Grains with Solubles", *Transactions of the ASAE*, vol. 41, No. 6, pp. 1-3, 1998.
M. Cheryan, Ultrafiltration and Microfiltration Handbook, Lancaster, PA; Technomic Publishing Co. 1998.
D. Chang, M.P. Hojilla-Evangelista, L.A. Johnson, D.J. Myers, "Economic-Engineering Assessment of Sequential Processing of Corn", *Transactions of the ASAE*, vol. 38, No. 4, 1995, pp. 1129-1138.
J.T. Chien, J.E. Hoff, L.F. Chen, "Simultaneous Dehydration of 95% Ethanol and Extraction of Crude Oil from Dried Ground Corn", *Cereal Chem.*, vol. 65, No. 6, 1988, pp. 484-486.
J.T. Chien, J.E. Hoff, M.J. Lee, H.M. Lin, Y.J. Chen, L.F. Chen, "Oil Extraction of Dried Ground Corn with Ethanol", *Chemical Engineering Journal*, vol. 43, 1990, pp. B103-B113.
L.C. Dickey, M.F. Dallmer, E.R. Radewonuk, N. Parris, M. Kurantz, J.C. Craig, Jr.,"Hydrocyclone Separation of Dry-Milled Corn", *Cereal Chem*, vol. 74, No. 5, 1997, pp. 676-680.
M.P. Hojilla-Evangelista, L.A. Johnson, D.J. Myers, "Sequential Extraction Processing of Flaked Whole Corn: Alternative Corn Fractionation Technology with Ethanol Production", *Cereal Chem*, vol. 69, No. 6, 1992, pp. 643-647.
N. Singh, M. Cheryan, "Membrane Technology in Corn Wet Milling", *Cereal Foods World*, vol. 42, No. 7, 1997, pp. 520-525.
"Membrane Technology in Corn Refining and Bioproduct-Processing", Starch/Stärke, vol. 50, No. 1, 1998, pp. 16-23.
V. Singh, S.R. Eckhoff, "Effect of Soak Time, Soak Temperature and Lactic Acid on Germ Recovery Parameters", *Cereal Chem.*, vol. 73, No. 6, pp. 716-720, 1996.
Abstract of Funded Research, Fiscal Year 1997, (Cheryan, M. abstract No. 9701992) 1997, [on-line], [retrieved on Sep. 22, 2000]. Retrieved from the internet: <URL: http://www.reeusda.gov/nri/pubs/archive/abstracts/abstract97/contents.htm and http://www.reeu.
Cao, N., Zu, Q., Ni, J., Chen, L.F., "Enzymatic Hydrolysis of Corn Starch After Extraction of Corn Oil with Ethanol," Applied Biochemistry and Biotechnology, vol. 57-58, 1996, pp. 39-47.
Cicuttini, A., Kollacks, W.A. and Reckers, C.J.N. Reverse Osmosis Saves Energy and Water in Corn Wet Milling, Starke 35: 149-154, 1983.
Dorr-Oliver, Equipment and Systems for Corn Wet Milling from Doff-Oliver brochure, Milford, CT, pp. 1-19, 1987.
Shukla, R., Tandon, R., Nguyen, M., and Cheryan, M., Microfiltration of Starch Suspensions Using a Tubular Stainless Steel Membrane, Membrane Technology (Elsevier), No. 120:5-8, 2000.
Campos, E.J., et al. 2002 Applied Biochemistry and Biotechnology 99(1-3): 553-576, Abstract (1 page).
U.S. Appl. No. 11/801,223, filed May 8, 2007, Cheryan.

*Primary Examiner* — Marsha Tsay
(74) *Attorney, Agent, or Firm* — Greer, Burns & Crain Ltd.

(57) ABSTRACT

Methods and apparatus for processing corn into one or more corn products. Zein is extracted from corn or corn products or by-products with a solvent. The corn-solvent mixture is separated into streams, one of which preferably includes an extract containing at least zein and solvent, and another that contains de-zeined corn solids and adsorbed solvent. The solvent is separated from the zein, and the de-zeined, desolventized corn solids are processed to provide one or more corn products.

19 Claims, 3 Drawing Sheets

METHOD AND SYSTEM FOR CORN FRACTIONATION

PRIORITY CLAIM

This application is a continuation-in-part of U.S. patent application Ser. No. 11/327,166, filed Jan. 6, 2006 now U.S. Pat. No. 7,569,671, which claims the benefit of U.S. Provisional Application Ser. No. 60/641,664, filed Jan. 6, 2005, under 35 U.S.C. §119.

FIELD OF THE INVENTION

The present invention relates generally to corn fractionation processes and equipment. The invention specifically concerns production of one or more corn products, such as industrial, food, feed, and/or kindred products, from corn.

BACKGROUND OF THE INVENTION

Dry milling, in which whole corn is ground or milled to produce products for feed and food uses, is a popular method in the art for processing corn. However, dry milling is typically restricted in its range of products, and it typically is not designed to separate the individual components of corn, except in certain methods wherein the corn is partially degerminated prior to milling.

Another method of processing corn is the dry-grind ethanol process, which conventionally includes dry-grinding whole corn, and adding enzymes and yeast to the cooked corn to produce primarily fuel ethanol. Yet another method is corn wet milling, which produces corn oil, corn gluten feed, corn gluten meal, starch, fiber, and corn steep liquor.

Conventional dry-grind and wet milling have limitations. For example, products of conventional dry-grind ethanol processing typically are limited to ethanol, carbon dioxide, and distillers dried grains with solubles (DDGS). Of these products, DDGS is a low-value animal feed, carbon dioxide has an even lower value and is often merely discharged to the atmosphere, and ethanol, if used for fuel, competes unfavorably with low-priced petroleum products. Thus, the dry-grind ethanol industry presently needs government subsidies and tax waivers, which are likely to be eliminated, for economic survival.

In wet milling, corn is first soaked in water (steeped) for several hours prior to undergoing a series of grinding and separation steps that result in one or more of several products such as corn oil, starch, corn gluten feed, corn gluten meal, fiber, and corn steep liquor. Corn wet milling produces a multitude of high value products, but requires high capital investments in plant and machinery. It also requires large amounts of water, typically 5-9 gallons per bushel of corn, primarily for the purification of starch and for steeping.

The required steeping of corn in conventional wet milling is time-consuming. For typical steeping, corn is soaked in water at about 50° C. and for 22-50 hours. Sulfur dioxide is added, and lactic acid is produced by bacteria. Steeping is done mainly to facilitate a subsequent separation of the germ that contains the oil.

Additionally, the water from the above steeping step ("steep water") is dilute and has to be evaporated. This requires a significant amount of energy. The evaporated steep water ("corn steep liquor") is sold as such or added to the corn gluten feed, which is a low-value animal feed.

SUMMARY OF THE INVENTION

Methods and apparatus for fractionation of corn are provided. In an example method, zein is extracted from corn or corn products or by-products with a solvent. The corn-solvent mixture is separated into streams, one of which preferably includes an extract containing at least zein and solvent, and another that contains de-zeined corn solids and adsorbed solvent. The solvent is separated from the zein, and the de-zeined, desolventized corn solids are processed to provide one or more corn products.

BRIEF DESCRIPTION OF THE DRAWINGS

Other features, objects and advantages of the invention will be apparent to those skilled in the art from the following detailed description and by reference to the drawings, of which.

DETAILED DESCRIPTION

Figure 1:
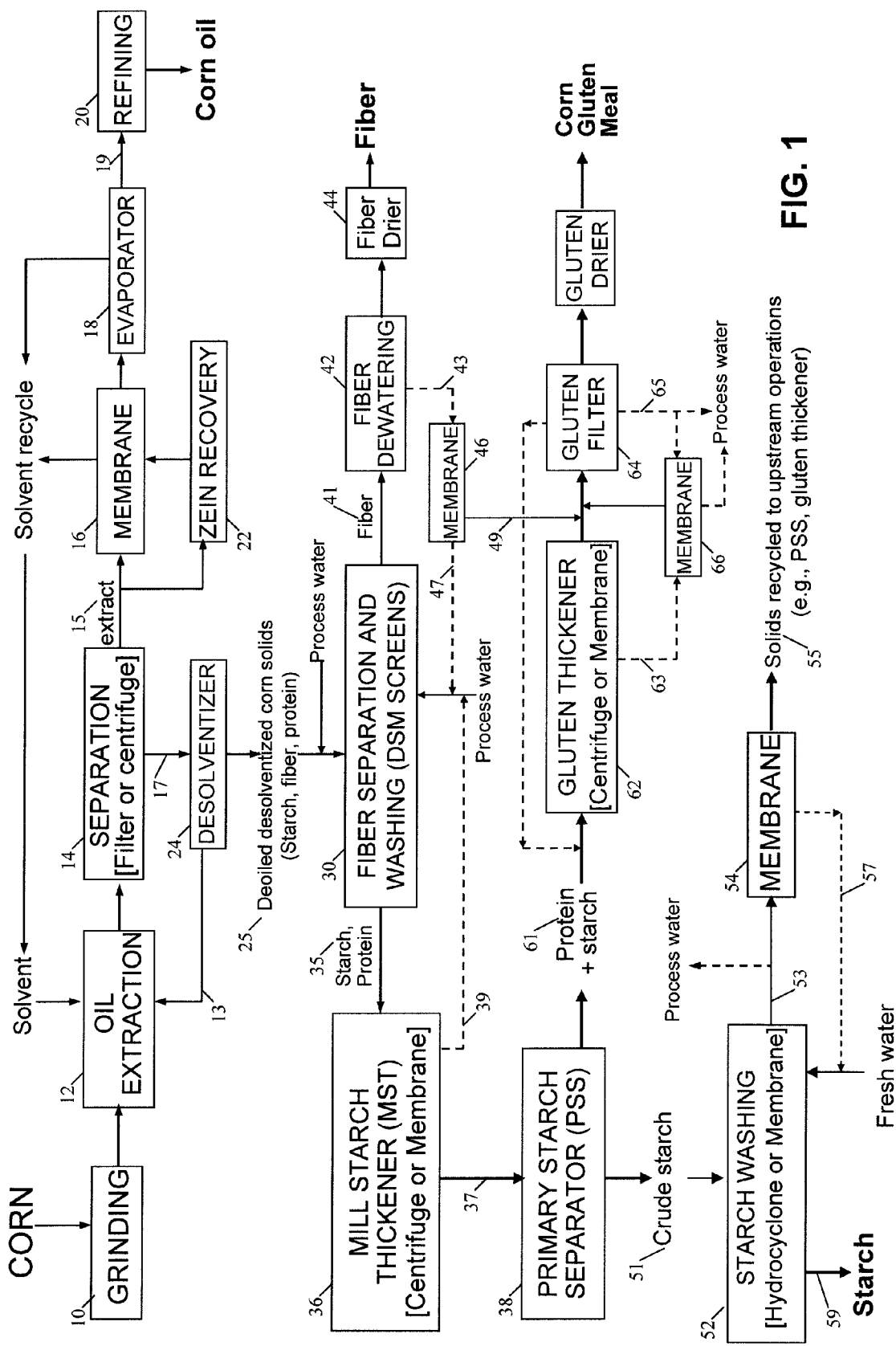
FIG. 1 is a schematic diagram showing steps in an example process for corn fractionation to produce one or more of corn oil, fiber, corn gluten meal and starch according to an embodiment of the present invention.

Preferred embodiments of the present invention provide a method of corn fractionation, and more particularly a method of processing corn into industrial, food, feed, and/or kindred products. A preferred process overcomes several limitations of conventional corn wet milling processes by eliminating the steeping and germ handling steps, and by reducing fresh water usage.

Generally, in certain example methods, oil is extracted from corn or corn products or by-products with a solvent. The corn-solvent mixture is separated into streams, one of which preferably includes an extract containing at least oil and solvent, and another containing de-oiled corn solids and adsorbed solvent. The solvent is separated from oil, and the de-oiled, desolventized corn solids are processed to provide one or more corn products.

More particularly, in a preferred method, corn is dry-ground and reacted with organic solvent to extract oil. The oil is separated from the resultant extract and recovered from the extract using membrane technology. Zein may also be produced if the solvent is ethanol, for example. The de-oiled meal is subjected to a series of grinding and separation operations such as centrifugation, hydryocyclones, and/or membrane technology to result in one or more additional products such as corn products, corn gluten meal, corn starch, and fiber. Zein may also be recovered by re-extracting the de-oiled meal with aqueous ethanol and ultrafiltering the extract.

In other example methods, zein is extracted from corn or corn products or by-products with a solvent. The corn-solvent mixture is separated into streams, one of which preferably includes an extract containing at least zein and solvent, and another containing de-zeined corn solids and adsorbed solvent. The solvent may be separated from the zein. The de-zeined, desolventized corn solids are processed to provide one or more corn products.

In a more particular example of this latter method, corn is dry-ground (e.g., grinding or dry-milling) and reacted with organic solvent to extract zein. A de-zeined meal is desolventized to provide de-zeined, desolventized corn solids, which undergo separation operations such as, but not limited to, fiber separation and washing to provide fiber, starch separation to provide starch, and gluten thickening to provide a high-oil protein, such as high-oil corn gluten meal. Remaining solids may be recycled to upstream operations, such as but not limited to further starch separation or gluten thickening.

A method that eliminates the steeping process, and yet produces corn oil with equivalent or greater yields and without the production or handling of germ, has been described in U.S. Pat. No. 6,433,146 to the present inventor, which is incorporated herein by reference. The '146 patent describes a method of obtaining corn oil using an organic solvent such as ethanol to extract the oil, followed by a primary separation step to filter the extract and a subsequent membrane separation to concentrate the oil in the extract and to recycle the solvent. The de-oiled corn solids residue from the primary separation step is one subject of this invention in certain example embodiments.

Alternatively or additionally, zein protein may be partially or substantially extracted using an ethanol extraction, separation and membrane separation. The zein-free corn solids, or alternatively the de-oiled zein-free corn solids, are processed by embodiments of this invention.

In an exemplary practice of this invention, the de-oiled corn solids are mixed with process water to create a suspension including starch, fiber and protein. It is subjected to grinding and separation steps to separate the fiber from the starch and protein. The fiber is washed and dried, and the fiber wash water is recycled as process water or membrane filtered to recover the protein and starch. Then, the starch-protein suspension is subjected to an optional concentration step followed by a separation step to separate the starch from the protein. The protein fraction, containing some starch, is thickened and dewatered prior to drying. The starch is purified by washing with fresh water. The wash water containing the impurities is simultaneously separated from the starch. This wash water is used as process water or is subjected to membrane clarification and concentration to enable it to be recycled as starch wash water and to recover the solids.

According to preferred embodiments for fractionation of corn, the corn is prepared for extraction, and the oil is extracted from the prepared corn with a solvent, providing an extracted corn-solvent mixture. The extracted corn-solvent mixture is separated into at least two streams, one including an extract containing the oil and solvent, and another stream including the de-oiled corn solids and adsorbed solvent. The solvent preferably is separated from the oil in the extract. The de-oiled corn solids may be desolventized to substantially remove the solvent and provide de-oiled, desolventized corn solids. These corn solids may be resuspended in water, and one or more of fiber, starch, and protein may be separated from the corn solids to produce corn products.

Alternatively or additionally, zein may be extracted from the de-oiled corn solids with a solvent. The de-oiled corn solids-solvent mixture may be separated into at least two streams, of which one is another extract containing the zein and solvent, and the other includes the de-oiled, de-zeined corn solids and adsorbed solvent. The solvent may be separated from zein by membrane processing the extract. The de-oiled, de-zeined corn solids may be desolventized to remove the solvent, and the desolventized, de-oiled, de-zeined corn solids may be resuspended in water. Fiber, starch and protein may be separated from these corn solids.

In yet another example process, corn is prepared for extraction, and zein is extracted from the prepared corn with a solvent, providing an extracted zein-solvent mixture. The extracted zein-solvent mixture is separated into at least two streams, one including an extract containing the zein and solvent, and another stream including the de-zeined corn solids and adsorbed solvent. The solvent may be separated from the zein in the zein-solvent mixture extract. The de-zeined corn solids may be desolventized to substantially remove the solvent and provide de-zeined, desolventized corn solids. These corn solids may be resuspended in water, and one or more of fiber, starch, and high-oil protein, such as high-oil corn gluten meal, may be separated from these solids.

In the above exemplary processes for separating corn, preparing the corn for extraction may include, for example, dry-grinding or flaking the corn. The extracting may include, for example, batch or continuous extracting, and the solvent may include a hydrocarbon, an alcohol, an ethanol such as 95-100% ethanol (if oil is to be primarily extracted), 60-90% oil (if zein is to be primarily extracted), or a solution thereof. Separating the extracted corn-solvent mixture may include, for example, centrifugation, filtration, or membrane filtration, and separating the first solvent from the oil or from the zein may include, for example, nanofiltration or ultrafiltration. Solvent that is separated may be recycled. Desolventizing the de-oiled corn solids, de-oiled, de-zeined corn solids, or de-zeined corn solids may use, for example, vacuum, steam, air, and/or gas. Separating the fiber, starch, and/or protein from the de-oiled desolventized corn solids, the de-oiled, de-zeined, de-solventized corn solids, and/or the de-zeined, desolventized corn solids may include, for example, one or more grinding or separation steps.

FIG. 1 shows a flow of a corn product extraction application of the invention to a dry mill ethanol plant. A preferred method of the present invention first extracts oil and/or zein from corn using, for example, the methods described in the '146 patent or by other methods. Corn or corn processing by-products are the main raw material for preferred embodiments of this invention. For example, the corn inputs may include corn (e.g., whole kernel or flaked corn), corn processing by-products (e.g., DDG, DDGS (distilled dried grains with solubles), corn gluten meal, corn germ, or corn meal.

The raw material is ground and or sieved 10 to an appropriate size and shape. For example, a hammer mill or similar size reduction device, or a flaking machine is used to reduce the corn to an optimum particle size for extraction of oil with a particular solvent. If the raw material is a corn processing by-product, such as whole corn meal from a dry miller, this grinding or sieving step 10 may not be necessary. Preferably, moisture content of the corn should be 0-14% by weight.

The oil is extracted 12 using an appropriate solvent in an extractor. For example, alcohols such as ethanol, hydrocarbons such as hexane, acetone, and the like, including solutions thereof, may be used, provided the solvent efficiently extracts oil from the corn particles or flakes. The extraction may be batch or continuous extraction.

The resulting slurry including corn solids and the solvent is subjected to a separation step 14, which may be, for example, centrifugation or filtration. The slurry is separated into an extract 15 and a de-oiled residue 17. The extract 15 is processed 16 through, for example, nanofiltration or reverse osmosis membranes to separate oil and/or other extracted components from the solvent. The concentrated extract is sent to an evaporator 18 to remove the residual solvent. This removed solvent may be re-used in the extraction step 12. The crude corn oil 19 preferably is refined 20, for example using methods well known in the vegetable oil industry.

Additionally, if ethanol, isopropanol, or similar solvent for extracting oil is used, a (usually) small amount of zein may be coextracted with oil in the extraction step 12, depending on the ethanol concentration and other conditions. The zein can be recovered 22 prior to the separation step 16 by processing the extract 15 with an ultrafiltration membrane, for example, and the permeate from recovery step 22 can be sent for oil recovery in separation step 16. Exemplary methods and membranes are described in the '146 patent.

The de-oiled corn solids 17 typically contain starch, protein, fiber, minor constituents of corn, and adsorbed solvent. These corn solids 17 are desolventized 24 by any of various methods or apparatus such as vacuum, steam, air, or gas. Heat may be applied to facilitate desolventizing the corn solids. The solvent vapor 13 may be reused in the extraction step 12.

Though it is not necessary for ethanol or other solvent to be produced in the same facility (e.g., a plant) as the extraction methods described herein, in-house ethanol may be preferred for economic reasons. For example, fermentation and distillation steps may be conducted to produce an ethanol supply for the extraction step 12. However, ethanol or other solvent for the extraction step 12 may be procured from outside sources. Costs of corn processing may be reduced by practicing extensive recycling of the solvent via the membrane step 16, the evaporation step 18, and/or the desolventizing step 24. The number of times the solvent can be recycled will depend on the level of impurities contained in the used solvent, and how it affects the extraction efficiency in the extraction step 12.

In preferred embodiments of the present invention, the de-oiled, desolventized corn solids 25 are made into a slurry by adding water, which may be either fresh water or, preferably, process water recycled from downstream operations. The amount of water added should be sufficient to efficiently conduct a fiber separation and washing step 30. This amount of water may be, for example, 1-10 parts by weight of water to one part by weight of the desolventized dry, de-oiled corn solids 25. In conventional wet milling, this is usually a ratio of 3 parts water to 1 part corn solids.

The slurry is sent to the fiber separation and washing step 30. This step is preferred to obtain maximum starch recovery while minimizing fiber in the final starch and protein products. Fiber separation and washing may include one or more individual steps, which are well known to those of ordinary skill in the art. For example, it may be optimal to first grind the de-oiled, desolventized corn solids 25 to release some of the starch from the fiber. Any of several milling devices known to those of ordinary skill in the corn wet milling art may be used to release the starch. For example, Entoleter-type mills that sling the material against pins at high speed may be used to free the starch with minimum fiber breakup. Disk mills, with counter-rotating disk mills or with only one disk rotating at high speed, can also be used.

The slurry of de-oiled, desolventized corn solids 25 preferably is separated in the fiber separating step 30 by centrifugation and/or filtration. A preferred method of fiber separation in corn milling employs a 50-70 micron wedge-wire pressure-fed screen, such as the 120 DSM screens made by Dorr-Oliver, of Milford, Conn. Wash water, usually recycled process water from other milling steps, is introduced in the last of 5-7 stages of the unit and flows counter-current to the fiber. The wash water emerges from the first fiber washing stage as an "undersize" fraction 35 with ideally all the starch and protein that was in stream 25. Washed fiber 41 from the last stage of the fiber separation step 30 is dilute, typically 5-20% solids. It is dewatered in a dewatering step 42 by mechanical devices or methods, such as by using screen centrifuges, screened reels, screw presses, belt presses, or the like. The fiber after the dewatering step 42 may be dried 44 in a drier, or may be mixed with other streams before drying.

Water 43 from the fiber dewatering step 42 may contain some starch and protein. To recover the soluble germ protein and other proteins that may be present in the fiber wash water 43, it may be sent back to the fiber separation step 30, or processed through an ultrafilter fitted with a protein-retaining membrane 46. The retained solids stream 49 from the membrane 46 can be sent to a primary starch separator step 38, to a gluten filter/drier 64, or it may be marketed as a protein product by itself. The clear permeate 47 from the membrane 46 can be used for the fiber separation step 30 or as process water.

After the fiber separation step 30, a stream 35, commonly referred to as the "mill stream", preferably contains only starch, protein (less the zein that may have been removed in the zein recovery step 22), and some soluble impurities. The solids level of the mill stream 35 may be low (typically 5%-20% starch and 0.5-2% protein). The starch and protein 35 preferably is thickened using a mill starch thickener (MST) 36. The MST 36 may be a centrifuge or a membrane filtration system, for example, as described in U.S. Pat. No. 6,648,978 to Liaw et al. The underflow (if thickened with a centrifuge) or the retentate (if thickened with a membrane) 37 may have a 20%-30% solids concentration. This level of solids may facilitate better operation of a primary starch separation step 38. The overflow or permeate 39 can be used as process water in the plant, which will also serve to recycle any solids that may be entrained in the overflow or permeate.

It may be advantageous to first pass the starch and protein stream 35 through a degritting step (not shown) prior to passing through the MST 36. The degritting step removes the relatively fine gritty materials that may be in the stream 35. Manifolded cyclone systems, for example, can be used for this purpose.

The primary starch separation step 38 separates starch from the other impurities of the underflow or retentate 37 based on density differences between the stream containing the protein and other impurities (which has a specific gravity of 1.1 or less) and the starch stream (which has a typical specific gravity of 1.6). In a preferred embodiment, disk-type nozzle centrifuges are used for the starch separation step 38, such as the BH-36B Primary Merco Centrifuge made by Dorr-Oliver. The overflow 61 is the gluten stream containing 60-70% protein on a dry basis. Gluten typically refers to the two major insoluble fractions of corn, commonly termed glutelin and zein. Gluten proteins are largely insoluble in water at normal or acidic pH. Gluten may account for up to 80% of the total nitrogen in corn.

The underflow 51 is a crude starch suspension typically containing 30-35% solids, of which the protein and other impurities is 2-5% on a dry basis. The starch underflow 51 is purified in a starch washing step 52, which preferably includes a series of hydrocyclones in multiple stages. About 1.5-3 parts by weight of water per part of dry starch are used in a preferred hydrocyclone system. Alternatively, a membrane microfiltration system such as that described by Shukla et al (Shukla, R., Tandon, R., Nguyen, M., and Cheryan, M., Microfiltration of starch suspensions using a tubular stainless steel membrane. Membrane Technology (Elsevier), No. 120: 5-8, 2000) may be used. A preferred microfiltration system uses 1-5 feed volumes of diafiltration water for optimal purification. This starch purification step 52 preferably is the only point in the overall process where fresh water is used.

Starch wash water 53 from the starch washing step 52 may contain starch, protein and impurities. The wash water 53 can be used as process water in other steps of the overall process, or it can be processed with a membrane filter 54 to recover some or substantially all of the solids in a retentate stream 55.

The retentate stream 55 can be recycled for use in the primary starch separating step 38 or to a gluten thickening step 62 depending on its composition. A permeate 57 from the membrane filter 54 preferably is clean enough to be recycled to the starch washing stage 52 if reverse osmosis or nanofiltration is used in the membrane step 54, or to the fiber washing stage 30 if an ultrafilter or microfilter is used in the membrane. In preferred embodiments of this invention, since there is no steeping of corn, the use of membrane filters 54 will reduce water usage in the plant. Typical reverse osmosis membranes include SW30 from Dow-FimTec or CPA from Hydranautics or AG from GE-Osmonics.

The output from the starch washing step 52 is a concentrated starch stream 59. This starch stream 59 may be dried or used further in the plant as needed.

The gluten (protein and starch) stream 61 resulting from the starch separation step 38 is processed in a gluten thickening step 62, which may employ a centrifuge in a conventional manner or a membrane filter, for example, as described in U.S. Pat. No. 5,968,585 to Liaw et al. The concentrated gluten stream may be sent to a gluten filter 64, and then dried for sale as corn gluten meal.

A dilute stream 63 from the gluten thickening step 62 and a dilute stream 65 from the gluten 64 may be used as process water in the plant. However, soluble germ proteins may be present in the gluten stream 61. There may thus be a significant quantity of protein in streams 63 and 65. In conventional corn wet milling, such soluble germ proteins are used for corn gluten feed, which is a low-value product. In a preferred embodiment of the invention, stream 63 and/or stream 65 is passed through an ultrafilter 66 fitted with a protein-retaining membrane to recover substantially all the protein. The recovered protein can be marketed as a corn protein fraction. The permeate from the ultrafilter 66 preferably is used as process water.

Figure 2:
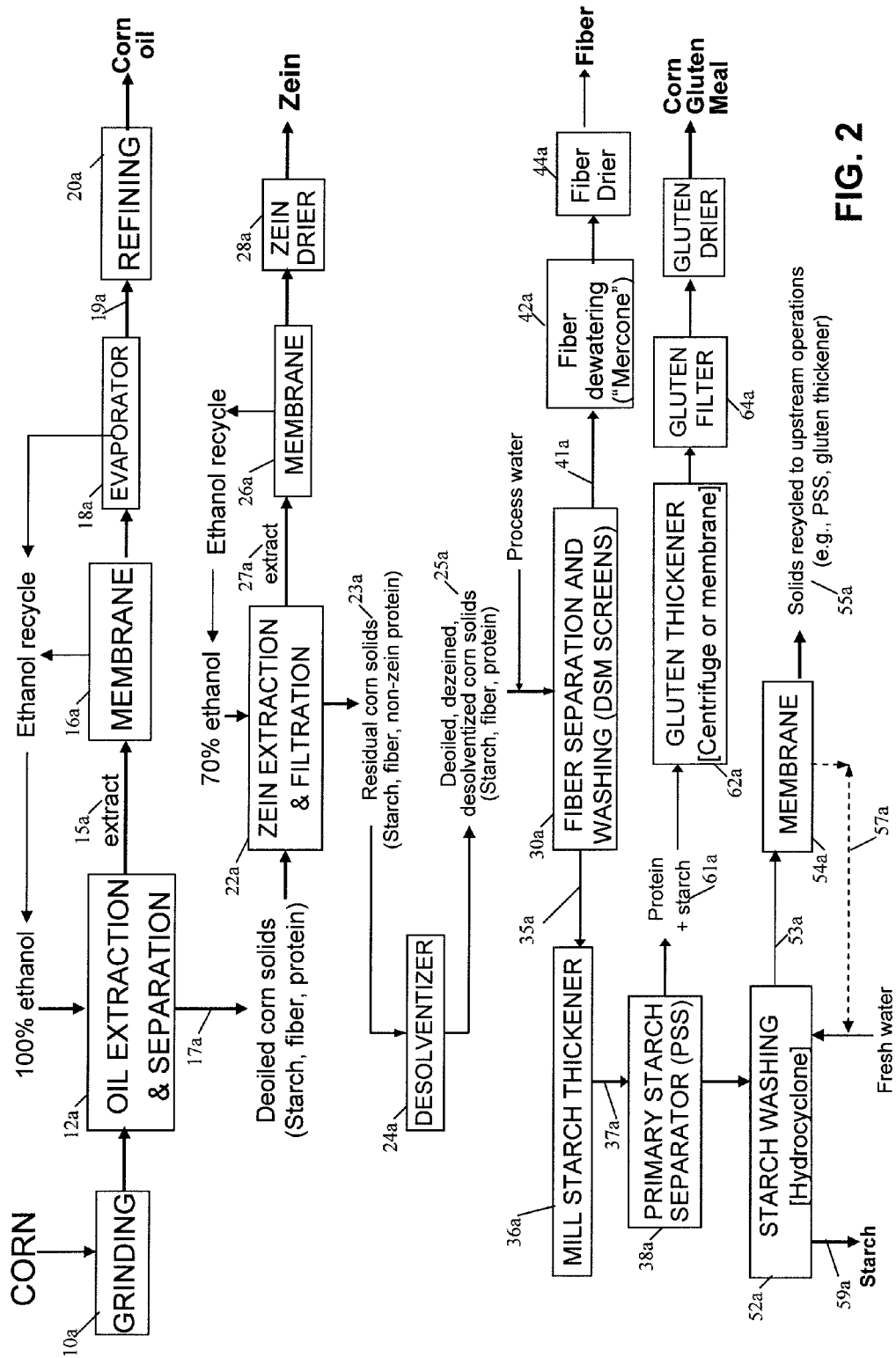
FIG. 2 is a schematic diagram showing steps in an example process for corn fractionation to produce one or more of corn oil, zein, fiber, corn gluten meal and starch according to an embodiment of the present invention.

Referring now to FIG. 2, a preferred process of the present invention for a plant focused on maximizing production of oil and zein is illustrated. Zein is an alcohol-soluble protein that has a multitude of uses. Steps similar to those shown and discussed with respect to FIG. 1 are labeled with like reference numerals.

Corn or corn processing by-products are the main raw material for this invention. The process for the oil extraction preferably is the same as described for FIG. 1 and shown in FIG. 2 as steps 10a through 20a. In this embodiment, de-oiled corn solids 17a are re-extracted (step 22a) with 60-90% aqueous ethanol, more preferably 65-75% aqueous ethanol in a suitable extractor. If a solvent other than 95-100% aqueous ethanol is used for oil extraction, the de-oiled corn solids 17a must be desolventized before zein extraction (this desolventizing step is not shown in FIG. 2).

After the zein extraction step 22a, the ethanol slurry is separated by filtration or centrifugation into an extract 27a and a de-oiled, de-zeined corn solids residue 23a. The extract 27a is processed through one or more ultrafiltration membranes 26a to separate the zein from the solvent and other low molecular weight impurities, as described in the '146 patent. The concentrated zein is sent to a drier 28a.

The de-oiled, de-zeined corn solids 23a typically contain starch, protein other than zein, fiber, minor constituents of corn and adsorbed solvent, and water. The corn solids 23a are desolventized 24a by any suitable means, such as vacuum, steam, air or gas. Heat may be applied to facilitate desolventizing the corn solids 23a. The solvent vapor may be reused in the extraction step 22a.

Similar to the process shown in FIG. 1, resultant de-oiled-de-zeined-desolventized solids 25a containing mainly starch, fiber and nonzein protein are processed to remove fiber and starch as illustrated in steps 30a-64a, which are similar to the steps illustrated in FIG. 1.

Figure 3:
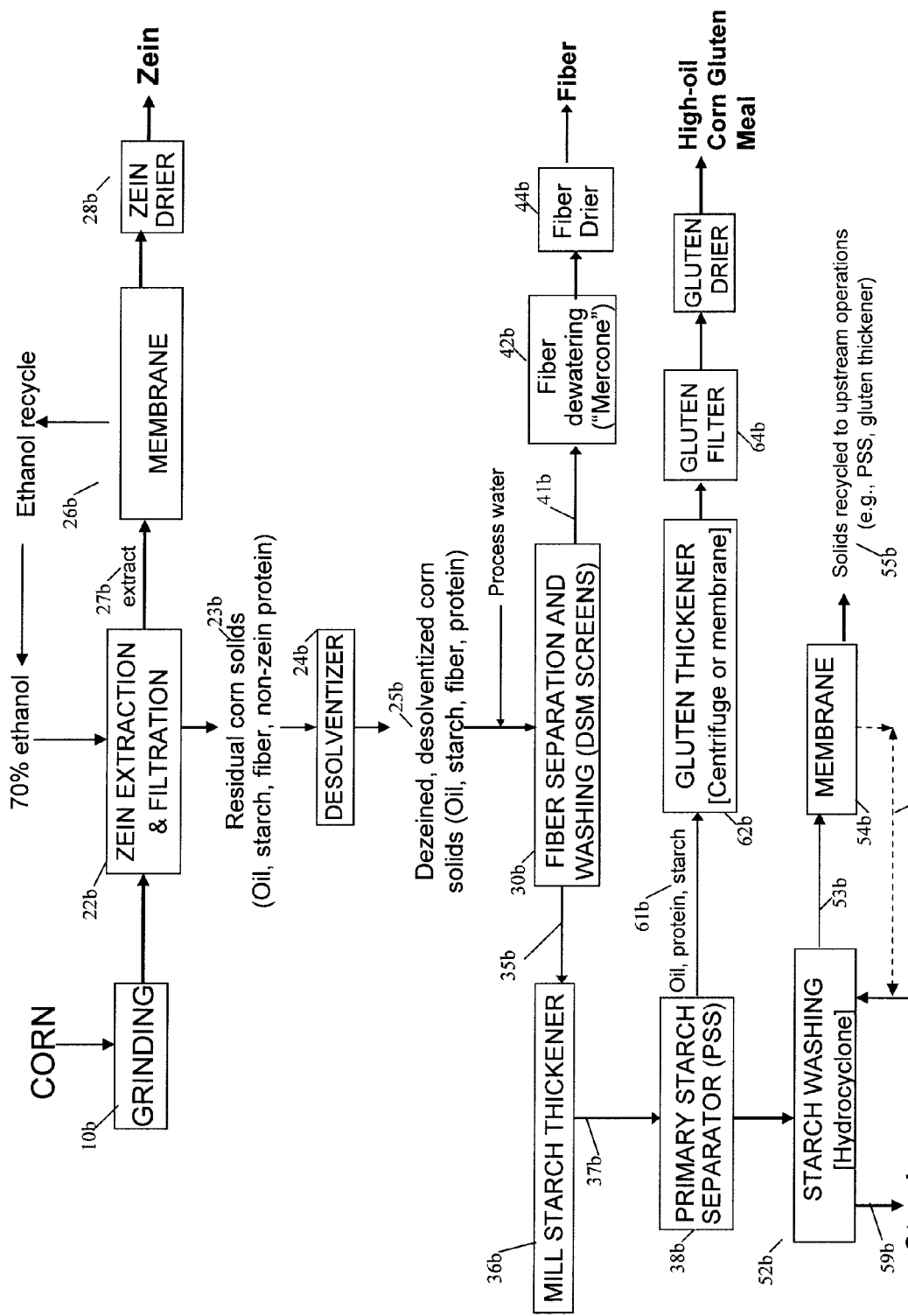
FIG. 3 is a schematic diagram showing steps in an example process for corn fractionation to produce one or more of zein, fiber, high-oil corn gluten meal and starch according to another embodiment of the present invention.

FIG. 3 shows another example method of the present invention, which includes a zein extraction followed by processing of de-zeined corn solids to provide one or more products. Steps similar and/or analogous to those shown and discussed with respect to FIG. 1 or FIG. 2 are labeled with like reference numerals.

Corn or corn processing by-products are an example main raw material, which may undergo a grinding and/or sieving step 10b. The zein is extracted 22b, for example, using a solvent such as 60-90% ethanol (as a more particular, non-limiting example, 65-75% ethanol, and even more particularly, 70% ethanol) in a suitable extractor. In an example method according to FIG. 3, oil is not deliberately extracted from the input corn or corn products or by-products (though some oil may be extracted as a result of other process steps, and though oil can be deliberately extracted downstream after later steps).

After the zein extraction step 22b, the ethanol slurry is separated, for example by filtration or centrifugation into an extract 27b including zein, ethanol, and water, and a de-zeined (i.e., at least some zein removed) corn solids residue 23b. The extract 27b may be processed as described above, including processing through one or more ultrafiltration membranes 26b to separate the zein from the solvent and other low molecular weight impurities, as described in the '146 patent. The concentrated zein may be sent to a drier 28b. Separated ethanol may be recycled (for example, for use in the solvent separation step 22b). The vapor from the zein drier, containing ethanol and water, may also be recycled to various processing steps as needed or desired.

The residual corn solids 23b typically contain oil, starch, protein other than zein, fiber, minor constituents of corn and adsorbed solvent, and water. These corn solids are desolventized 24b by any suitable means, such as methods or devices employing vacuum, steam, air, or gas. Heat may be applied to facilitate desolventizing the corn solids 23b. The solvent vapor may be reused in the extraction step 22b.

Similar to the example processes shown in FIGS. 1 and 2, resultant de-zeined-desolventized corn solids, still containing oil, can be processed to remove fiber and starch as illustrated in steps 30b-64b, which are similar to the analogous steps illustrated in FIGS. 1 and 2. However, due to the additional presence of oil in the corn solids 23b, different end products can result. For example, after subjecting the de-zeined, desolventized corn solids 23b to fiber separation and washing 30b, the resulting stream 35b preferably contains oil, starch, protein (less the zein that may have been removed in the zein recovery step 22b), and some soluble impurities. Separated fiber 41b may be dewatered 42b and dried 44b as described above. The starch and protein (with oil) 35b can be thickened using the MST 36b, as described above (a degritting step may be used prior to the MST, as also explained above).

The underflow or retentate 37b from the MST 36b undergoes a primary starch separation step 38b, resulting in gluten 61b including protein, starch, and a significant concentration of oil. Following the gluten thickening 62b (e.g., using a centrifuge or a membrane filter, as described above) and subsequent gluten filtering 64b and drying, a high-oil corn gluten meal results, which may be separately used or sold.

After the primary starch separation 38b, the separated starch may be washed 52b, for example as described above, to provide a starch product 59b. Additional membrane filtering 54b can be used on the starch wash water 53b to recover solids 55b that, if desired, can be recycled to upstream operations.

Preferred embodiments of the invention provide efficient, flexible and simple processes for production of several products from corn. Further, a preferred process eliminates steeping of corn, which is one of the most troublesome and unpredictable steps in the conventional corn wet milling process, and thus eliminates associated operations such as steep water evaporators. Also preferably eliminated is the loss of corn solids that occurs due to leaching into the steep water.

Germ handling and separation preferably is completely eliminated. Crude corn oil is produced in certain embodiments rather than germ, thus ensuring a higher value to the corn processor. In addition, germ proteins may be retained for more valuable use rather than being lost with the germ (if the germ is sold to an outside oil processor) or put into corn gluten feed. Zein may alternatively or additionally be produced in some embodiments along with other coproducts that have oil as a significant component.

Preferably, germ proteins can be incorporated into corn gluten meal, which is a higher-value coproduct, or marketed as a separate product. In particular example embodiments, the corn gluten meal can also contain a significant oil concentration, which may provide additional value.

The volume of low-value corn gluten feed preferably is reduced or eliminated. In a traditional corn wet mill, corn gluten feed is typically 21% protein (dry basis). This low-value product is used as a repository for otherwise unmarketable components or by-products or waste matter generated in a corn wet mill. Examples include corn steep liquor, fiber, germ proteins, "mud" from the clarification of dextrose, fermentation by-products, filter aid, and the like. Such a product may also be produced in embodiments of this invention by blending the fiber with the protein streams if needed. A substantially pure corn fiber may also be generated, which may have higher market value than if it is incorporated into corn gluten feed.

Further, preferred embodiments of the invention reduce fresh water usage in the plant by using membrane technology in several places in the process train, and most preferably membrane technology is used to recover water and solids from the starch washing stage.

The various embodiments described in the present invention should not be construed as being restrictive in that other modifications, substitutions and alternatives to specific equipment and methods are possible and would be appreciated by those of ordinary skill in the art. For example, it should be understood that "membrane" refers to the appropriate membrane, whether it is microfiltration, ultrafiltration, nanofiltration, or reverse osmosis. Further, it should be understood that diafiltration may be used when necessary to purify the solids, and that combinations of these membrane techniques may be used. It will be further understood that specific corn products can be selected for production, and thus it may not be necessary to produce all available products in a particular process, nor to perform all steps to make such corn products available. Also, it should be understood that, though preferred embodiments of the present invention provide several opportunities for recycling of ethanol and/or process water, the present invention is not to be limited to processes that recycle at all possible steps.

While various embodiments of the present invention have been shown and described, it should be understood that other modifications, substitutions, and alternatives are apparent to one of ordinary skill in the art. Such modifications, substitutions and alternatives can be made without departing from the spirit and scope of the invention, which should be determined from the appended claims.

Various features of the present invention are set forth in the pending claims.

What is claimed is:

1. A process for fractionation of corn, the process comprising:
   preparing the corn for extraction to obtain prepared corn that has not been steeped and has not been de-germed;
   extracting zein from the prepared corn that has not been steeped and has not been de-germed with a solvent to provide an extracted zein-solvent mixture, wherein the solvent comprises at least one of an alcohol, an ethanol, and a solution of at least one of an alcohol or ethanol combined with water;
   separating the extracted zein-solvent mixture into at least a stream including an extract comprising the zein and solvent, and another stream comprising de-zeined corn solids and adsorbed solvent;
   separating zein from the solvent in the extract by membrane processing the extract;
   desolventizing the de-zeined corn solids to remove the adsorbed solvent;
   resuspending said desolventized, de-zeined corn solids in water; and
   separating one or more of the fiber, starch, and protein from the resuspended desolventized, de-zeined corn solids to produce one or more corn products.

2. The process of claim 1 wherein said preparing the corn for extraction comprises at least one of dry-grinding the corn and flaking the corn.

3. The process of claim 1 wherein said extracting using the solvent comprises at least one of batch and continuous extracting.

4. The process of claim 1 wherein said separating the extracted corn-solvent mixture uses at least one of centrifugation, filtration, and membrane filtration.

5. The process of claim 1 wherein said separating the solvent from the zein comprises ultrafiltration.

6. The process of claim 1 wherein said desolventizing the de-zeined corn solids uses at least one of vacuum, heat, steam, air and gas.

7. The process of claim 1 wherein said separating one or more of the fiber, starch, and protein comprises separating fiber, and further comprising:
   washing the separated fiber.

8. The process of claim 7 further comprising:
   dewatering and drying the separated and washed fiber.

9. The process of claim 8 wherein the wash water from said fiber dewatering is membrane filtered to recover protein and starch.

10. The process of claim 7 wherein the de-zeined, desolventized corn solids after said fiber separating comprise a suspension including substantially oil, starch, and protein in water, and further comprising:
    dewatering and thickening the suspension by at least one of a centrifuge, a membrane microfilter, and a membrane ultrafilter.

11. The process of claim 10 wherein the suspension is separated into crude starch and a protein fraction including oil.

12. The process of claim 11 further comprising:
    washing and purifying the crude starch using water.

13. The process of claim 12 wherein said washing and purifying uses at least one of a hydrocyclone and a membrane microfilter.

14. The process of claim 13, further comprising:
passing the wash water from said starch purifying through at least one of a membrane, a reverse osmosis membrane, a nanofiltration membrane, an ultrafiltration membrane and a microfiltration membrane, to recover clean water and concentrated solids.

15. The process of claim 14 wherein the permeate from said passing through the membrane is recycled to upstream operations.

16. The process of claim 15 further comprising:
recycling retained solids from said passing through the membrane to upstream operations to recover the solids.

17. The process of claim 11, further comprising:
thickening the separated protein fraction in a gluten thickener, wherein the gluten thickener includes at least one of a centrifuge, a membrane microfilter, and an ultrafilter designed to retain substantially all proteins and starch.

18. The process of claim 17 wherein said thickening uses a centrifuge, and wherein the overflow from the centrifuge is sent to at least one of a membrane microfilter, an ultrafilter, and a nanofilter to recover substantially all the protein.

19. The process of claim 18 wherein said thickening uses a gluten filter, and further comprising:
membrane processing the filtrate from the gluten filter using at least one of reverse osmosis, nanofiltration, ultrafiltration, and microfiltration to recover protein with oil.

* * * * *